United States Patent [19]

Aoi

[11] Patent Number: 4,989,194
[45] Date of Patent: Jan. 29, 1991

[54] OPTICAL INFORMATION PROCESSING METHOD OF DRIVING AUTO-FOCUSING AND/OR AUTO-TRACKING MEANS IN ACCORDANCE WITH A STORED SERVO SIGNAL WHEN IRRADIATION OF A RECORD MEDIUM WITH LIGHT BEAM IS STOPPED, AND APPARATUS THEREFOR

[75] Inventor: Shigeru Aoi, Kawasaki, Japan

[73] Assignee: Canon Kabushiki Kaisha, Tokyo, Japan

[21] Appl. No.: 412,589

[22] Filed: Sep. 26, 1989

[30] Foreign Application Priority Data

Dec. 3, 1986 [JP] Japan .................................. 61-286781

[51] Int. Cl.$^5$ ............................................. G11B 7/09
[52] U.S. Cl. .................................. 369/44.27; 369/32; 369/111; 369/116
[58] Field of Search ...................... 369/32, 43, 53, 54, 369/58, 111, 116, 44.27, 44.28; 360/38.1

[56] References Cited

U.S. PATENT DOCUMENTS

| | | | |
|---|---|---|---|
| 4,205,338 | 5/1980 | Schaefer | 369/46 |
| 4,527,263 | 7/1985 | Nakagawa | 369/46 |
| 4,623,994 | 11/1986 | Nabeshima et al. | 369/54 X |
| 4,669,075 | 5/1987 | Abe | 360/38.1 X |
| 4,688,202 | 8/1987 | Mukai et al. | 369/44 |

FOREIGN PATENT DOCUMENTS

| | | | |
|---|---|---|---|
| 61-066269 | 4/1986 | Japan | 360/38.1 |
| 61-250876 | 11/1986 | Japan | 360/38.1 |

Primary Examiner—Aristotelis M. Psitos
Attorney, Agent, or Firm—Fitzpatrick, Cella, Harper & Scinto

[57] ABSTRACT

An optical information processing method comprises a step of recording and/or reproducing information by irradiating a light beam to a periodically relatively moving record medium, detecting focusing and/or tracking servo signals and driving auto-focusing and/or auto-tracking means in accordance with the detected servo signals, a step of storing detected servo signals of at least one period of the movement of the medium, and a step of stopping the irradiation of the light beam to the medium and driving the auto-focusing and/or auto-tracking means in accordance with the stored ervo signals. An optical information processing apparatus for embodying the above method comprises a device for irradiating a light beam to an optical information record medium, a device for periodically moving the record medium relative to the light beam, a device for detecting focusing and/or tracking servo signals from the light beam reflected by or transmitted through the medium, auto-focusing and/or auto-tracking device, a feedback circuit for feeding the detected servo signal back to the auto-focusing and/or auto-tracking device, a device for storing the detected servo signals of at least one period of movement of the medium, and control device for deactivating the feedback circuit and activating the auto-focusing and/or auto-tracking device in accordance with the signals stored in the storage device when the irradiation of the light beam to the medium is stopped.

14 Claims, 3 Drawing Sheets

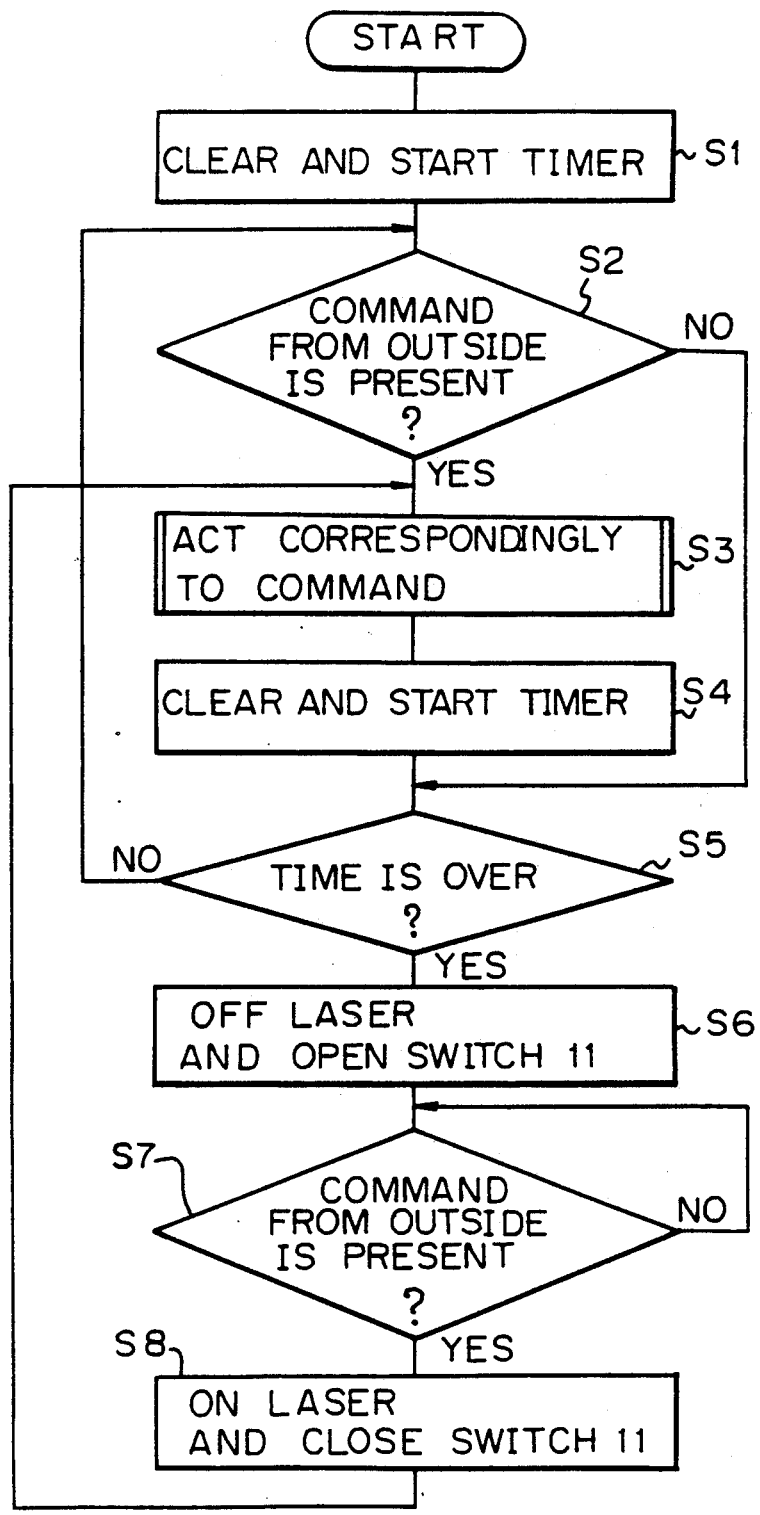

OPTICAL INFORMATION PROCESSING METHOD OF DRIVING AUTO-FOCUSING AND/OR AUTO-TRACKING MEANS IN ACCORDANCE WITH A STORED SERVO SIGNAL WHEN IRRADIATION OF A RECORD MEDIUM WITH LIGHT BEAM IS STOPPED, AND APPARATUS THEREFOR

This application is a continuation of application Ser. No. 07/127,636 filed Dec. 1, 1987, now abandoned.

BACKGROUND OF THE INVENTION

1. Field of the Invention

The present invention relates to an optical information processing method of recording and/or reproducing information by irradiating a light beam to an optical record medium, and an apparatus therefor.

2. Related Background Art

FIG. 1 shows a schematic diagram of a prior art optical information processor. In FIG. 1, numeral 21 denotes a laser light source such as a semiconductor laser, numeral 22 denotes a collimator lens for collimating a light beam emitted from the laser light source 21, numeral 23 denotes a half-mirror, numeral 24 denotes an objective lens, numeral 25 denotes a lens actuator for driving the objective lens 24 along an optical axis of the lens and perpendicularly thereto, numeral 26 denotes a disk shaped optical record medium (disk), numeral 27 denotes a motor for rotating the disk 26, numeral 28 denotes a focusing lens for focusing a light reflected by the disk 26, numeral 29 denotes a photo-detector, numeral 34 denotes a control circuit for feeding the output of the photo-detector 29 back to the lens actuator 25, numeral 35 denotes a controller, and numeral 37 denotes a laser driver.

In the apparatus of FIG. 1, when information is to be recorded, the controller 35 causes the laser light source 21 to emit the light beam modulated with record information in accordance with a command from an external device. The emitted light beam passes through the collimator lens 22 and the half-mirror 23 and focused onto the disk 26 as a fine spot by the objective lens 24. Record bits corresponding to the record information are formed on the disk 26 in an optically detectable form by the irradiation of the light beam. The light beam reflected by the disk 26 passes through the objective lens 24, reflected by the half-mirror 23 and focused onto the photo-detector 29 by the focusing lens 28. The photo-detector 29 detects a focusing servo signal and a tracking servo signal. Those detected signals are fed back to the lens actuator 25 through the control circuit 34 so that the auto-focusing is done to allow the light spot to be exactly focused onto the disk 26 and the auto-tracking is done to allow the light spot to exactly trace a preformed track on the disk 26.

When information is to be reproduced, the controller 35 causes the laser light source 21 to emit a light at a constant intensity which is low enough to assure that no information is recorded, through the laser driver 37. The information recorded on the disk 26 is reproduced by the photo-detector 29 while the auto-focusing and the auto-tracking are done as are in the record mode. When information is not to be recorded nor reproduced, the laser light source emits a light at a low intensity as it does in the reproduce mode and the apparatus stands by until a record or reproduce command is issued while it makes auto-focusing and auto-tracking controls.

The focusing and tracking servo signals may be detected in the following manner. FIG. 2 shows a block diagram of the control circuit 34 of FIG. 1. In FIG. 1, the focusing lens 28 comprises a rotary symmetric lens and a cylindrical lens having a base line thereof arranged to make an angle of 45° with respect to the track of the disk 26. Accordingly, the reflected light focused by the focusing lens 28 creates an astigmatism, and the photo-detector 29 is arranged at a position of a minimum scatter circle of the reflected light when the spot is exactly focused on the disk 26. A photosensing plane of the photo-detector 29 is divided into four sensors 29a, 29b, 29c and 29d. The spot of the reflected light forms a circle shown by a solid line in an in-focus state, and in a defocus state it forms an ellipse shown by a broken line having a major axis orthogonal to the direction of defocusing. The outputs of the diagonal sensors 29a and 29c, and 29b and 29d are added together by summing amplifiers 30 and 31, respectively, and the sum signals are differentiated by a differential amplifier 32 so that the focusing servo signal is produced. The focusing servo signal is supplied to a focusing coil 42 of the actuator 25 through a focusing driver 33 and the objective lens 24 is moved along the optical axis in accordance with the focusing servo signal so that the auto-focusing control is made.

A divide line D of the photo-detector 29 corresponds to the direction of the track of the disk 26. As the light spot on the disk 26 deviates from the track, light distributions on the left and right sides of the divide line D are unbalanced depending on the direction of deviation. Thus, by adding the outputs of the sensors 29a and 29d, and 29b and 29c by adders 38 and 39 and differentiating the sum signals by a differential amplifier 40, the tracking servo signal is produced The tracking servo signal is supplied to a tracking coil 43 of the actuator 25 through a tracking driver 41, and the objective lens 24 is driven in a direction orthogonal to the optical axis and cross the track in accordance with the tracking servo signal so that the auto-tracking control is made.

Such an optical information processor is shown in detail in U.S. Pat. No. 4,293,944. In U.S. Pat. No. 4,205,338 and U.S. Pat. No. 4,527,263, one disk circumference of detected tracking servo signals are stored and the auto-tracking means is driven in accordance with the stored servo signals to record or reproduce information.

However, in such a prior art apparatus, since the light beam is irradiated to the medium even in a stand-by state in which information is not recorded or reproduced, durability of the light source is short. In order to avoid the above problem, the irradiation of the light beam to the medium may be stopped during the stand-by time, but since the focusing and tracking servo signals are not detected during that period, the objective lens is at a position which is totally independent from the movement of the medium. As a result, when the light beam is again irradiated to the medium to resume recording or reproducing, a time is required before the auto-focusing and auto-tracking servos are pulled in.

SUMMARY OF THE INVENTION

It is an object of the present invention to provide method and apparatus for processing optical information which can extend a durability of a light source without extending a time from a stand-by state to resumption of recording or reproducing.

The above object of the present invention is achieved by an optical information processing method comprising the steps of:

recording and/or reproducing information by irradiating a light beam to an periodically relatively moving record medium, detecting focusing and/or tracking servo signals and driving auto-focusing and/or auto-tracking means in accordance with the detected servo signals;

storing detected servo signals of at least one period of the movement of the medium; and stopping the irradiation of the light beam to the medium and driving the auto-focusing and/or auto-tracking means in accordance with the stored servo signals.

An optical information processing apparatus for embodying the above method comprises:

means for irradiating a light beam to an optical information record medium, means for periodically moving the record medium relative to the light beam;

means for detecting focusing and/or tracking servo signals from the light beam reflected by or transmitted through the medium;

auto-focusing and/or auto-trcking means;

a feedback circuit for feeding the detected servo signal back to said auto-focusing and/or auto-tracking means;

means for storing the detected servo signals of at least one period of movement of the medium; and control means for deactivating the feedback circuit and activating the auto-focusing and/or auto-tracking means in accordance with the signals stored in said storage means when the irradiation of the light beam to the medium is stopped.

BRIEF DESCRIPTION OF THE DRAWINGS

FIG. 4 shows a flow chart of steps of an optical information processing method of the present invention.

DETAILED DESCRIPTION OF THE PREFERRED EMBODIMENTS

Embodiments of the optical information processing method and apparatus of the present invention are now explained.

Figure 3:
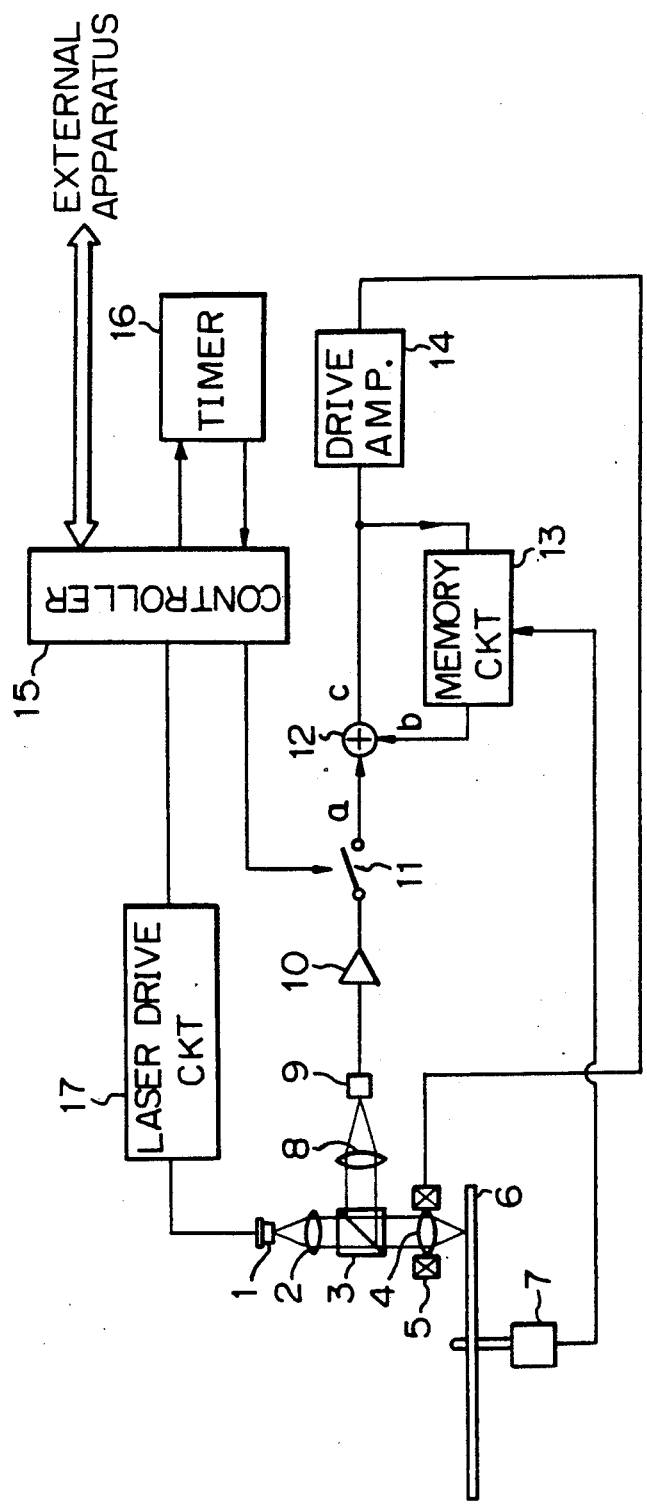
FIG. 3 shows a block diagram the preferred embodiment of an optical information processing apparatus of the present invention.

FIG. 3 shows a block diagram of one embodiment of the optical information processing apparatus of the present invention.

Numeral 1 denotes a laser light source, numeral 2 denotes a collimator lens for collimating a light beam emitted from the laser light source 1, numeral 3 denotes a half-mirror, numeral 4 denotes an objective lens, numeral 5 denotes a lens actuator which vertically and horizontally drives the objective lens 4 in accordance with plane vibration and track vibration of a disk-shaped optical record medium (disk) 6, numeral 7 denotes a motor for rotating the disk 6, and numeral 8 denotes a focusing lens for focusing a light reflected by the disk 6 onto a photo-detector 9.

The photo-detector 9 outputs an information signal which provides a signal for reproducing information on the disk 6, a focusing servo signal and a tracking servo signal. The focusing servo signal is explained here.

In FIG. 3, numeral 10 denotes a pre-amplifier, numeral 11 denotes a switch for opening and closing a focus control loop, numeral 12 denotes an adder for adding a focus detection signal a and a stored signal b, and numeral 13 denotes a memory, which stores an output c of the adder 12 in synchronism with the rotation of the motor 7, reads it after one period of disk rotation in synchronism with the rotation of the motor 7 and supplies it to the input of the adder 12 as the stored signal b. Numeral 14 denotes a drive amplifier for vertically driving the objective lens 4 in accordance with the output signal c of the adder 12, numeral 15 denotes a controller which controls communication with an external device, a timer 16, a laser driver 17, tracking and seeking.

The operation of the apparatus is now explained in accordance with a flow chart of the controller 15 shown in FIG. 4.

The flow is started when the disk 6 is loaded to the apparatus, the laser light source is activated and the apparatus waits for a reproduce or erase command from the external device while it carries out the auto-focusing and auto-tracking controls. The switch 11 is in the closed position and the closed loop control of the focus control is effected. The light beam repeatedly traces one track on the rotating disk 6. Accordingly, for a spiral track, the light beam is jumped one track for each disk revolution.

The timer 16 is first started (step S1). Then, the presence or absence of the command from the external device is checked (step S2). If it is present (YES in the step S2), record, reproduce or erase operation is carried out in accordance with the command (step S3), and the timer 16 is initialized and started (step S4).

The above loop is repeated until the timer 16 reaches a predetermined count (NO loop in a step S5). Assuming that the predetermined count is five seconds, if there is no command issued from the external device for more than five seconds (YES in the step S5), the next step is initiated. The laser 1 stops emitting the light beam and the switch 11 is opened (step S6). As the switch 11 is opened, the focus detect signal a to the input of the adder 12 becomes zero and hence c=b. Since the output signal b of the memory 13 is the output signal c of the adder of one disk period earlier, the signal c periodically repeats the same waveform in synchronism with the rotation of the disk 6.

Since the signal c drives the objective lens 4 through the drive amplifier 14, the objective lens 4 repeats the movement of one revolution of the disk immediately before the opening of the switch 11. Accordingly, even after the light emission of the laser has been stopped, the objective lens 4 holds the focus position within a pull-in range of the focus control. This state continues until the next command is externally issued (NO loop in a step S7). When the new command is issued (YES in the step S7), the laser is activated and the switch 11 is closed to effect the closed loop control (step S8). Since the objective lens 4 is within the pull-in range of the focus control without newly pulling in the focus, the closed loop control may be immediately effected so that the record, reproduce or erase operation is carried out in accordance with the command.

The effect of the present invention is achieved by storing the movement of the focusing means corresponding to one immediately preceding revolution of the disk to the opening of the switch 11.

While the focusing control was explained in the above embodiment, the same method may be used for the tracking control. Namely, a tracking servo signal for one revolution of the disk is stored, and when the light emission of the laser light source is stopped, the objective lens is driven across the track in accordance with the stored servo signal. In the tracking control, however, it is difficult to drive the objective lens within the pull-in range of the tracking when the lens is driven with the switch opened, but since the tracking servo signals are generated from the adjacent tracks and the objective lens is driven substantially along the track, the frequency of crossing the track may be low and the re-pull-in is accelerated.

Figure 1:
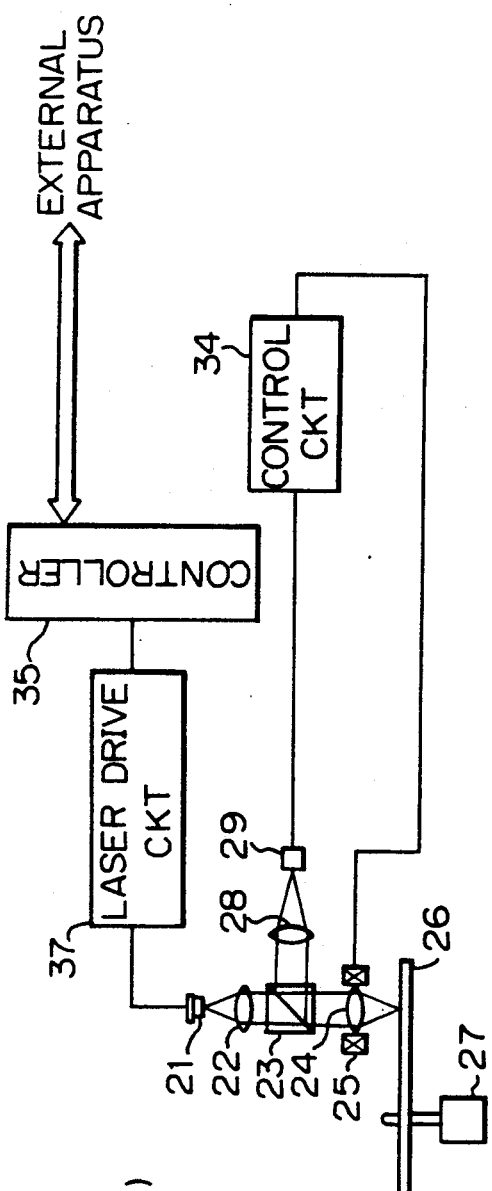
FIG. 1 shows a block diagram of a prior art optical information processing apparatus.
Figure 2:
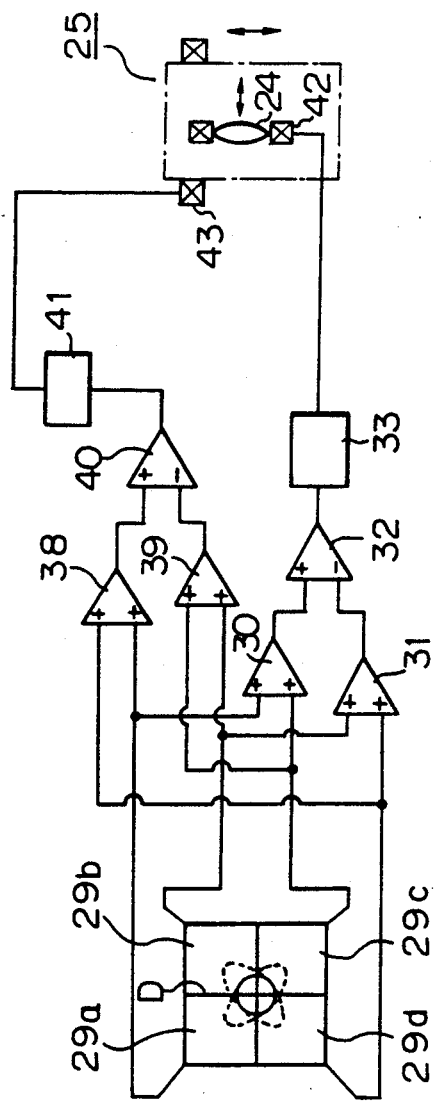
FIG. 2 shows a block diagram of a control circuit in the apparatus of FIG. 1.

The focusing servo signal and tracking servo signal in the above embodiment may be detected by the same configuration as that shown in FIG. 2. A known focus detection method such as a knife edge method and a known tracking signal detection method such as a 3-beam method may be used.

For digital record, if an interval between sample times is sufficiently short compared to the servo frequency and a resolution (number of bits) is high, a low-pass filter is not necessary, but in other cases, the output of the memory 13 must be passed through a low-pass filter a phase is retarded but it may be compensated by reading the record earlier.

The present invention is not limited to the above embodiments but various mofidications may be made. For example, in FIG. 3, the adder 12 may be omitted and the detect signal a and the stored signal b may be selectively applied to the drive amplifier 14 by the switch. The signal stored in the memory 13 is updated for each revolution of the disk. The present invention is also applicable to an apparatus which uses a deflection mirror instead of the lens actuator as the tracking means. When a light transmissive record medium is used, the photo-detector 9 is designed to sense a transmitted light instead of the reflected light from the medium. The present invention is further applicable to an apparatus which uses other form of record medium such as an optical card reader/ writer. For example, where the medium makes linear reciprocal movement, the servo signal stored corresponds to a signal for one reciprocation of the medium.

I claim:

1. An optical information processing method, comprising the steps of:
   recording or reproducing information while irradiating a periodically relatively moving recording medium with a light beam;
   detecting focusing or tracking servo signals from the light beam irradiating the recording medium;
   driving auto-focusing or auto tracking means in accordance with the detected servo signals;
   storing at least one of the detected servo signals of at least one period of relative movement of the medium when the medium is irradiated with the light beam;
   stopping the irradiation of the medium with the light beam;
   driving one of the auto-focusing and auto-tracking means in accordance with the at least one stored servo signal when the irradiation of the medium with the light beam has stopped; and
   re-starting the irradiation of the medium with the light beam for detecting the focusing or tracking servo signals and driving auto-focusing or auto-tracking means in accordance with the detected servo signals.

2. An optical information processing apparatus, comprising:
   means for irradiating an optical information recording medium with a light beam;
   drive means for periodically moving the recording medium relative to the light beam;
   detecting means for detecting focusing or tracking servo signals from the light beam reflected by or transmitted through the medium;
   auto-focusing or auto tracking means;
   a feedback circuit means for feeding the detected servo signals back to said auto-focusing or auto-tracking means;
   memory means for storing at least one of the detected servo signals of at least one period of movement of the medium;
   instructing means for instructing said light beam irradiating means to selectively start and stop the irradiation of the medium with the light beam; and
   switching means instructed by said instructing means for selectively activating said feedback circuit means when the medium is irradiated with the light beam and deactivating said feedback circuit means when the medium is not irradiated with the light beam wherein said auto-focusing or auto-tracking means is driven in accordance with the at least one servo signal stored in said storing means when the irradiation of the medium with the light beam has stopped.

3. An optical information processing apparatus according to claim 2, wherein said instructing means includes a timer and a controller for causing said timer to measure time from the end of a first recording or reproducing operation and instructing said light beam irradiation means to stop the irradiation of the medium with the light beam when a second recording or reproducing command is not externally issued within a predetermined time from the end of first recording or reproducing operation.

4. An optical information processing apparatus according to claim 2, wherein said switching means includes a switch for opening or closing a loop of said feedback circuit means.

5. An optical information processing apparatus according to claim 2 wherein said light beam irradiation means includes a light source and an objective lens for condensing a light beam emitted from the light source onto the medium.

6. An optical information processing apparatus according to claim 5 wherein said auto-focusing and/or auto-tracking means includes an actuator for driving the objective lens along and/or perpendicularly to an optical axis of the objective lens.

7. An optical information processing apparatus according to claim 2 wherein said feedback circuit includes an adder for adding an output signal of said detection means and an output signal of said storage means, and an output signal of said adder is supplied to said auto-focusing and/or auto-tracking means and said storage means.

8. An optical information processing apparatus according to claim 2 wherein said record medium is an optical disk and said relative movement means is a motor for rotating said optical disk.

9. An optical information processing method comprising the steps of:

recording or reproducing information while irradiating a periodically relatively moving recording medium with a light beam condensed by an optical system having an optical axis;

detecting focusing or tracking servo signals from the light beam irradiating the recording medium;

moving the optical system in one of a first direction parallel to the optical axis and a second direction perpendicular to the first direction, in accordance with the detected servo signals;

storing signals indicating the movement of the optical system corresponding to at least one period of movement of the medium when the medium is irradiated with the light beam;

stopping the irradiation of the medium with the light beam;

moving the optical system in one of the first direction and the second direction in accordance with the stored signals when the irradiation of the medium with the light beam has stopped; and moving the optical system in one of the first direction and the second direction in accordance with detected signals obtained by re-starting the irradiation of the medium with the light beam and detecting focusing or tracking servo signals from the light beam.

10. An optical information processing apparatus, comprising:

a light source;

an optical system having an optical axis and condensing a light beam emitted from said light source and irradiating an optical information recording medium with the light beam;

a motor for periodically moving the medium relative to the light beam;

a detector for detecting focusing or tracking servo signals from the light beam reflected at or transmitted through the medium;

an actuator for moving said optical system in at least one of a first direction parallel to the optical axis and a second direction perpendicular to the first direction;

a feedback circuit for feeding detected servo signals back to said actuator;

a memory for storing signals indicating movement of said optical system corresponding to at least one period of movement of the medium;

an instructing circuit for instructing said light source to start and stop irradiation of the medium with the light beam; and a switching circuit for activating said feedback circuit in accordance with an output of said instructing circuit when the medium is irradiated with the light beam and deactivating said feedback circuit when irradiation of the medium with the light beam has stopped, said switching circuit driving said actuator in accordance with the signals stored in said memory, instead of the deactivation of said feedback circuit.

11. An apparatus according to claim 10, wherein said instructing circuit comprises a timer and a controller for measuring time from completion of a recording or reproducing operation and for instructing said light source to stop irradiation of the medium with the light beam when no instruction for subsequently recording or reproducing is input in a predetermined time period.

12. An apparatus according to claim 10, wherein said switching circuit comprises a switch for opening and closing a loop of said feedback circuit.

13. An apparatus according to claim 10, wherein said feedback circuit comprises an adder for adding output signals of said detector and output signals of said memory, and output signals of said adder are input to said actuator and said memory.

14. An apparatus according to claim 10, wherein the medium comprises an optical disk, and said motor rotates the optical disk.

* * * * *

UNITED STATES PATENT AND TRADEMARK OFFICE
CERTIFICATE OF CORRECTION

PATENT NO. : 4,989,194

DATED : January 29, 1991

INVENTOR(S) : Shigeru Aoi

Page 1 of 2

It is certified that error appears in the above-identified patent and that said Letters Patent is hereby corrected as shown below:

ON THE TITLE PAGE:

Insert as Item [63] --Related U.S. Application Data: This application is a continuation of application Serial No. 07/127,636 filed December 1, 1987, now abandoned.--.

IN THE ABSTRACT

Line 11, "stored ervo signals." should read --stored servo signals.--.

COLUMN 2

Line 40, "cross" should read --across--.

COLUMN 3

Line 7, "an" should read --a--;
Line 27, "auto-trcking means;" should read --auto-tracking means;--; and
Line 44, "diagram the" should read --diagram of the--.

UNITED STATES PATENT AND TRADEMARK OFFICE
CERTIFICATE OF CORRECTION

PATENT NO. : 4,989,194

DATED : January 29, 1991

INVENTOR(S) : Shigeru Aoi

Page 2 of 2

It is certified that error appears in the above-identified patent and that said Letters Patent is hereby corrected as shown below:

COLUMN 5

Line 30, "a phase" should read --and phase-- and "compensated by" should read --compensated for by--; and
Line 46, "form" should read --forms--.

Signed and Sealed this

Eighteenth Day of August, 1992

Attest:

Attesting Officer

DOUGLAS B. COMER

Acting Commissioner of Patents and Trademarks